Dec. 10, 1929. W. H. DOSSEY 1,739,444
COMBINATION BREAD BOARD AND COVER
Filed Jan. 26, 1928
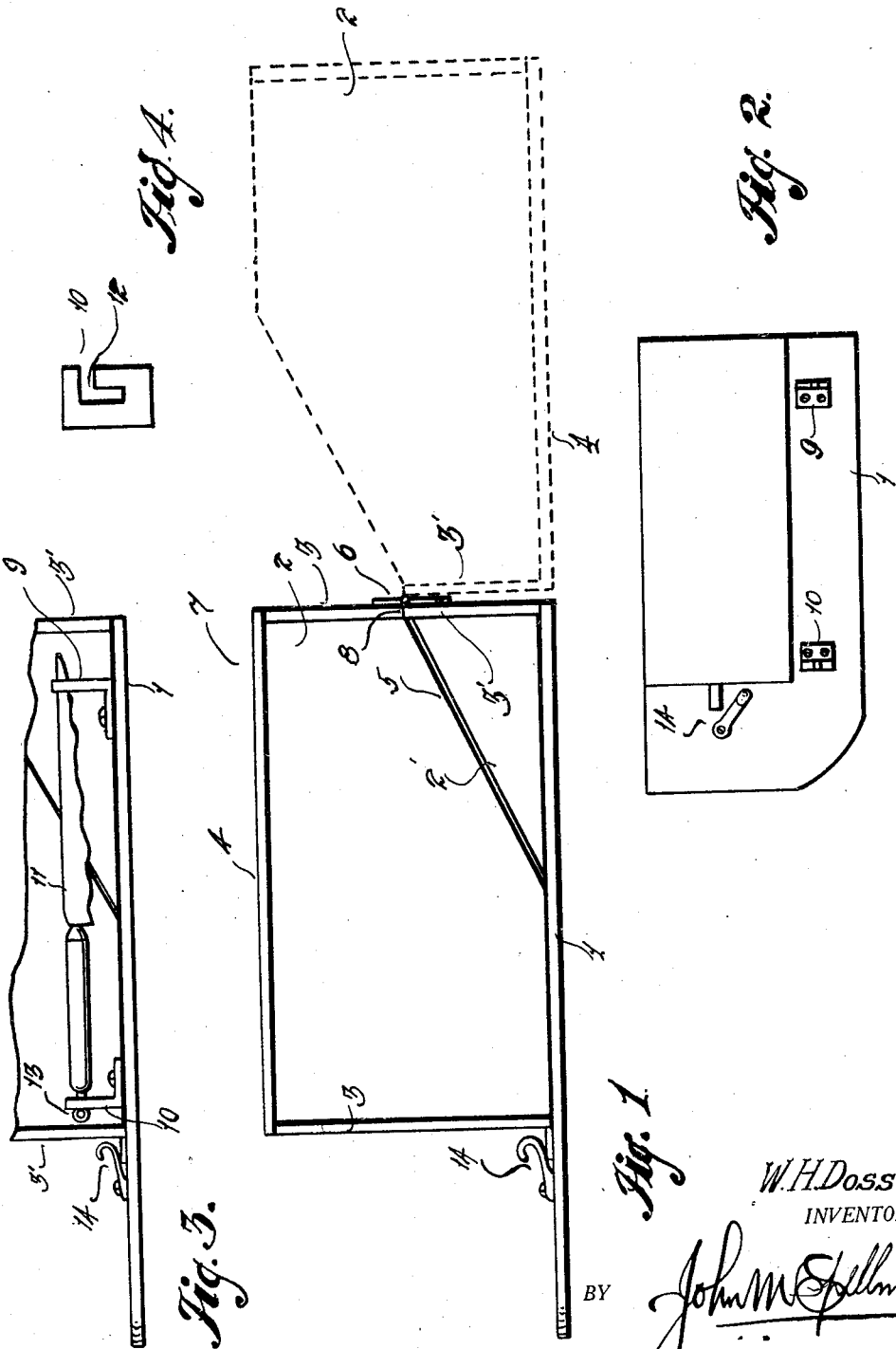
W. H. Dossey.
INVENTOR.
BY John M Spillman
ATTORNEY.

Patented Dec. 10, 1929

1,739,444

UNITED STATES PATENT OFFICE

WILLIAM H. DOSSEY, OF DALLAS, TEXAS

COMBINATION BREAD BOARD AND COVER

Application filed January 26, 1928. Serial No. 249,562.

The object of this invention is to provide a combination bread-board and receptacle for bread in loaf form of standard and customary size to retain the freshness and soft quality of the bread.

A further object of the invention is to provide a combination bread-board and receptacle which may be opened and closed quickly and conveniently and containing a support on the board for a bread knife.

A still further object of the invention is to provide in the arrangement thereof means for enabling the receptacle to be swung open and the two parts to be maintained in a level and stationary position on the same plane without oscillation.

The invention will be clearly understood from a perusal of the following detailed description, taken in connection with the accompanying drawing and wherein:

Figure 1 is a side elevational view of the invention, the knife supports removed, the dotted lines indicating the open position of the device.

Figure 2 is a plan view of the invention.

Figure 3 is a detailed sectional view, and illustrating the knife in its supports on one side of the bread-board; and Figure 4 is a detail view of one of the knife supports.

Referring more closely to the drawings 1 denotes the bread board which forms the base of the device and is in one piece and may be decorated if desired. The receptacle has side members 2 and end members 3 and a top piece 4. These parts may be nailed or otherwise secured together as preferred. The receptacle is so constructed that one side and one end as clearly shown in Figure 1 are flush with the corresponding side and end of the board. The object of this is to provide ample space on the remainder of the board for supporting and cutting the loaf when desired.

The side members 2 are cut diagonally as indicated at 5, severing the receptacle, and the two parts are hinged at 6. In this manner the receptacle can be swung open as indicated by the dotted lines in Figure 1 and the loaf of bread made accessible for cutting.

In order that the upper portion of the receptacle 7 which serves as a cover also, may lie even and flat and on the same plane as the bread board, the lower end members 3' are cut so as to extend just a trifle above the triangular side members 2' as indicated at 8.

The bread board 1 is provided with supports 9 and 10 for a knife 11. The supports are slotted, the support 10, see Figure 4, has the slot extended laterally as at 12 to lock the screw-eye or projection 13 in place.

The receptacle and board have fastening means 14 which may however be of any suitable arrangement and construction, and modifications may also be made in other parts of the invention, in keeping with the appended claim.

What is claimed is:

In a combination cutting board and receptacle for loaf bread, the combination with a lower section, of an upper section hinged to said lower section, said lower section comprising a base, a rear end and triangular side members, said upper section comprising a rear end, a forward end, side walls and top, said rear ends of said upper and lower sections being hinged together to permit said upper section to be swung into open and closed position relatively to said lower section for completely enclosing a loaf of bread within said upper and lower sections when in closed position and exposing said loaf of bread on said base in position for cutting the same when said upper section is swung into open position relative to said lower section, said triangular side members terminating short of the forward end of said base for providing a maximum unobstructed plane surface on said base for cutting said loaf of bread positioned on said base.

In testimony whereof I affix my signature.

WILLIAM H. DOSSEY.